7004X
C. Washburn,
Latch.
Patented Apr. 18, 1832.
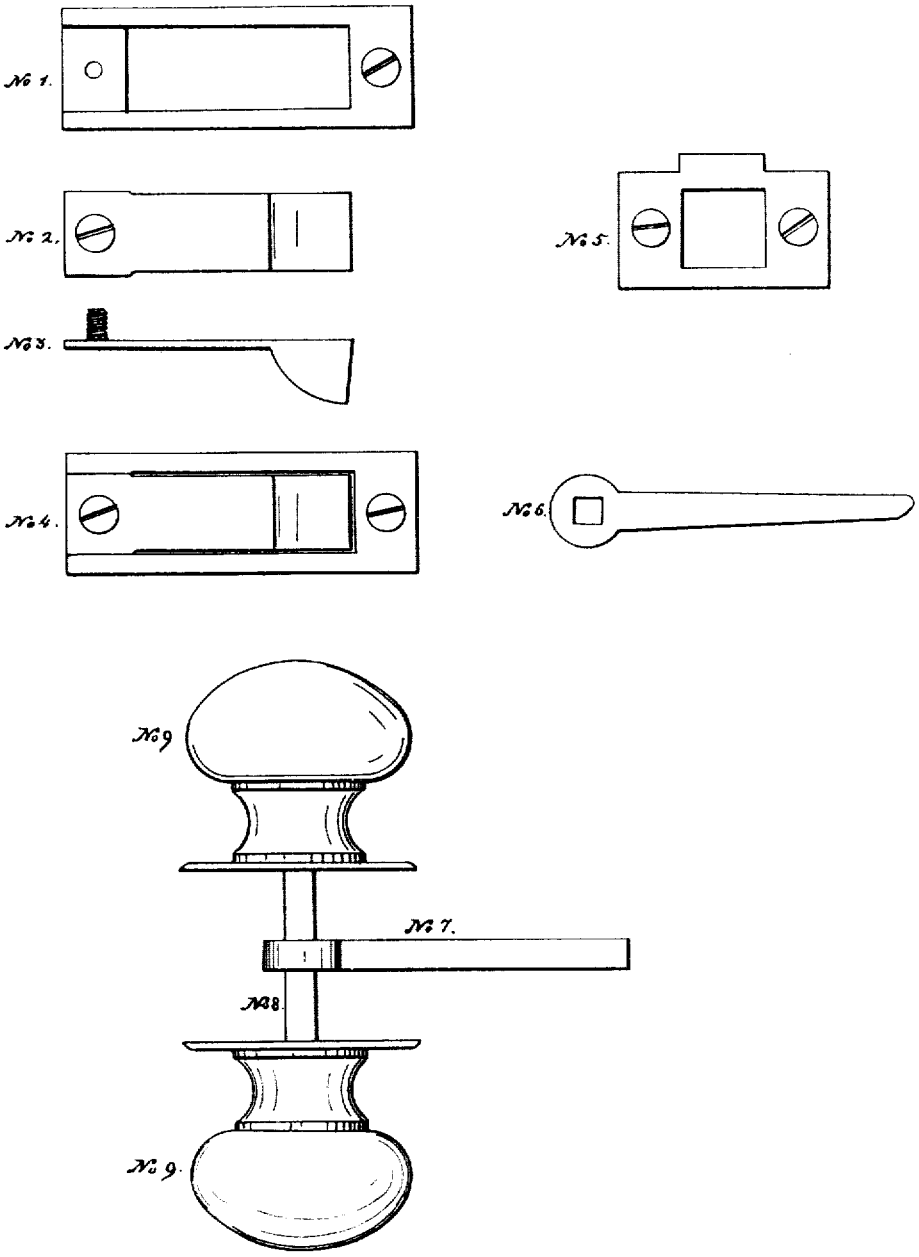
AM. PHOTO-LITHO. CO. N.Y. (OSBORNE'S PROCESS.)

Calvin Washburn of Bridgewater, Massachusetts

Letters Patent

The schedule referred to in these Letters Patent and making
part of the same, containing a description in the words of the
said Calvin Washburn himself, of his improvement in the construc
-tion of Door Fasteners.
To all to whom these presents shall come
Be it known that I Calvin Washburn of Bridgewater in the
County of Plymouth and State of Massachusetts, have invented
a new and useful improvement in the construction of Door
Fasteners and that the following is a full and exact descrip
-tion of the construction and operation of said improvement as inven-
-ted by me, The improvement consists in a bolt or catch of
brass, iron or metal, which is fixed or hung upon a straight
spiral or other shaped spring, which spring throws or forces out
the bolt or catch into a cavity or hole prepared to receive the same
(thus holding or retaining the door firmly in its place when shut)
and a short lever to disengage the same bolt or catch from the hole
or cavity so as to open the door one end of this said lever is fixed
or attached to a short gudgeon running through or across and
working the same, with handles at either or both ends - the other
end of said lever is allowed to work freely up and down in the
afore described hole or cavity. When the handle or handles are
turned by applying the hand, this last described end of the
lever is carried upwards thereby forcing the bolt or catch back
-ward into a cavity prepared to receive the same - The Door
is then disengaged and free to open, as soon as it is opened the
same end of the lever being freed from pressure drops to the
bottom of the said hole or cavity which receives the bolt or catch, &
the door is free to be shut or closed - A plate of iron or other metal with a hole in it corresponding to the shape of the
bolt or catch is fastened around the hole or cavity which re-
ceives the bolt or catch when the door is shut, to protect the
material of which the door is made from wearing away at that
part which passes over or rubs against said bolt, or catch,
and another similar plate around the aperture through which
the spring with the bolt or catch attached works, The inventor makes use of knobs, or handles of brass
glass or other material and of the common thumb piece
with the norfolk handles in common use, — The inventor
claims as his improvement the Spring Bolt or Catch with the
mortised lever acting upon the same as hereinbefore described
other material may be used and differently combined, than
is described in the preceding specification, and he thinks it
proper to state that any approximation to the general method
of constructing as herein before described which shall be substantially
the same he considers as coming within the real and just
extent of his invention In testimony that the above is a true specification
of my said improvement I have hereunto set my hand and
seal this 26th day of March A.D. 1832.

Witnesses
Abram Washburn
Mitchell. Keith

Calvin Washburn

[illegible]

Drawing /

600 [illegible]